US006178929B1

United States Patent
Schatz

(10) Patent No.: US 6,178,929 B1
(45) Date of Patent: Jan. 30, 2001

(54) METHOD AND APPARATUS FOR OPERATING A COOLING FLUID CIRCUIT OF AN INTERNAL COMBUSTION ENGINE

(75) Inventor: Oskar Schatz, Gauting (DE)

(73) Assignee: Schatz Thermo System GmbH, Erling-Andechs (DE)

( * ) Notice: Under 35 U.S.C. 154(b), the term of this patent shall be extended for 0 days.

(21) Appl. No.: 09/295,671

(22) Filed: Apr. 21, 1999

(30) Foreign Application Priority Data

Apr. 22, 1998 (DE) .............................................. 198 18 030

(51) Int. Cl.[7] .............................. F01P 11/20; F02N 17/06
(52) U.S. Cl. .................................. 123/41.14; 123/142.5 R
(58) Field of Search ............................. 123/41.05, 41.08, 123/41.09, 41.02, 41.14, 142.5 R

(56) References Cited

U.S. PATENT DOCUMENTS

| 4,550,694 | * | 11/1985 | Evans ................................... 12/41.02 |
| 4,718,600 | * | 1/1988 | Adam ................................... 237/2 A |
| 5,174,254 | * | 12/1992 | Humburg ........................ 123/142.5 R |
| 5,255,733 | * | 10/1993 | King ....................................... 165/299 |
| 5,299,630 | * | 4/1994 | Schatz ..................................... 165/10 |
| 5,558,055 | * | 9/1996 | Schatz ............................ 123/142.5 R |
| 5,743,466 | * | 4/1998 | Humburg ......................... 237/12.3 B |
| 5,809,944 | * | 9/1998 | Aoki et al. ........................... 123/41.02 |
| 5,950,576 | * | 9/1999 | Busato et al. ....................... 123/41.08 |
| 5,967,101 | * | 10/1999 | Roth et al. .......................... 123/41.29 |
| 6,021,752 | * | 2/2000 | Wahle et al. .................... 123/142.5 R |

* cited by examiner

Primary Examiner—Andrew M. Dolinar
Assistant Examiner—Hai Huynh
(74) Attorney, Agent, or Firm—Harness, Dickey & Pierce, PLC

(57) ABSTRACT

A method of operating cooling fluid circuit of an internal combustion engine for an automotive vehicle at cold start of said engine. Said cooling fluid circuit includes pump means, a heat storage and a cabin heating system heat exchanger interconnected between said heat storage and said engine. The method comprises unloading said heat storage to transfer heat thereof to cooling fluid circulating in said cooling fluid circuit and operating said heat exchanger so as to transfer at least some of the heat of the circulating cooling fluid to heating air of said cabin heating system. Said heat storage is being unloaded in a first unloading phase during which the cooling fluid circulates in said cooling fluid circuit at a flow rate substantially corresponding to the saturation point of said heat exchanger, and thereafter in a second unloading phase during which the cooling fluid circulates in said cooling fluid circuit at a rate reduced such that the temperature of the heating air entering the vehicle cabin remains at a uniform level during said second unloading phase until said engine has reached a temperature sufficient to maintain said uniform level.

14 Claims, 3 Drawing Sheets

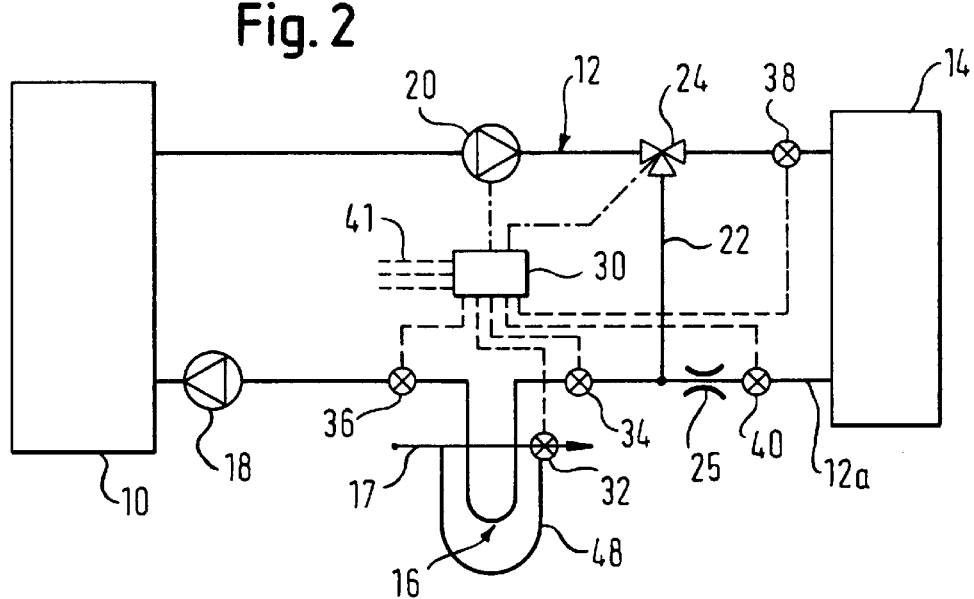
Fig. 2
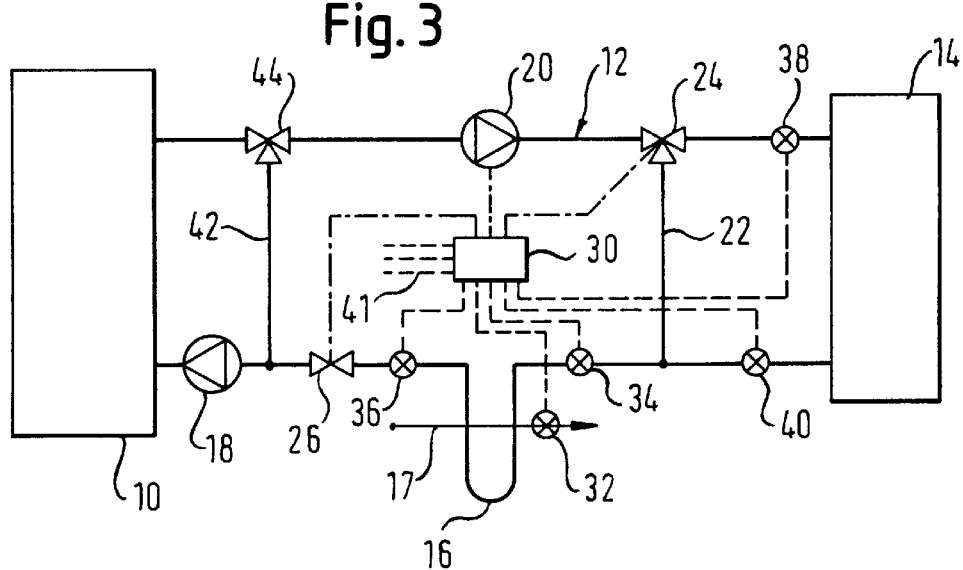
Fig. 3
Fig. 5
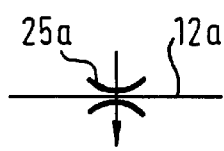
Fig. 4
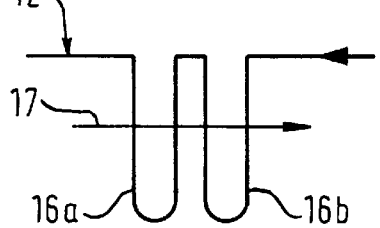
Fig. 6
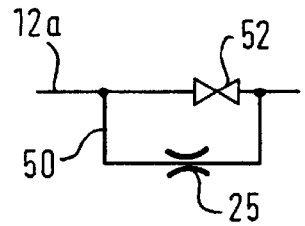

METHOD AND APPARATUS FOR OPERATING A COOLING FLUID CIRCUIT OF AN INTERNAL COMBUSTION ENGINE

BACKGROUND OF THE INVENTION

The present invention relates to a method and an apparatus for operating a cooling fluid circuit of an internal combustion engine for an automotive vehicle. The cooling fluid circuit includes a heat storage and a heat exchanger for a cabin heating system. The heat storage may be any heat storage which can be unloaded by a flowable medium; preferably the heat storage is a cooling fluid storage which can be loaded and unloaded by exchange of the cooling fluid.

Such heat storages which store waste heat of the engine have become known for quite some time. They may be used at cold start of the engine for heating the heating air for the vehicle cabin and/or for heating the engine to reduce exhaust gas emissions, see for example, "BWK Brennstoff Wärme Kraft", Vol. 43 (1991) No. 6, pages 333–337.

In practice operation of such heat storages is generally such that when the heat storage is being unloaded the cooling fluid (cooling water) flows initially from; the heat storage through the heating system heat exchanger and thereafter through the engine and finally back into the heat storage in order to heat during cold start of the engine both the heating air and the engine as rapidly as possible. When the heat storage has been unloaded the system will be switched from the "storage heat supply mode" to the "engine heat supply mode". The terms "storage heat supply mode" and "engine heat supply mode" mean that the cooling fluid circuit communicating with the heating system heat exchanger is being supplied with heat from the heat storage and, respectively, directly from the engine.

The cooling fluid circuit usually includes—additional to the cooling fluid pump (water pump) driven by the engine—an electrical additional pump which provides for a high flow rate of the cooling fluid during cold start of the engine. A high flow rate of the cooling fluid flow is required in particular in order to enable operation of the heating system heat exchanger under so-called saturation conditions even at low engine speeds. Saturation conditions of the heat exchanger mean that a further increase of the flow rate of the cooling fluid flow from e.g. 600 l/h does not result in a significant increase of the temperature of the heating air. Such a high flow rate of the cooling fluid flow is required in particular by so-called cross-flow heat exchangers generally used in automotive vehicles. Cross-flow heat exchangers are of a design such that short air flow paths result in order to minimize pressure losses of the required air flow at the required surface areas of the heat exchanger at minimal space.

Operation of the heating system heat exchanger under saturation conditions has become usual in the field of automotive vehicles because this allows to reach the maximal heating air temperature by the cooling fluid discharged from the engine and gradually being heated from ambient temperature to operative temperature. This is why at cold start of the engine the high flow rate of the hot cooling fluid discharged from the heat storage results in maximal heating air temperatures within the heat exchanger operating under saturation conditions and a rapid substantial increase of the temperature of the heating air when the heat storage initially is being unloaded. On the other hand high flow rates of the cooling fluid flow cause the heat storage to be unloaded rapidly. As a result the temperature of the heating air initially increases very rapidly to a relatively high value such as e.g. 45° and thereafter rapidly drops to the level of the temperature of the engine which at the time is still relatively low (e.g. 20°), until the temperature of the heating air will again be raised gradually due to the engine heating up. The above mentioned temperature drop of the heating air is considered to be disturbing for the vehicle occupants; for comfort reasons it is desirable to maintain the temperature of the heating air after its rapid increase at a substantially uniform level until the engine will have reached a temperature sufficient for maintaining or increasing such temperature level.

In order to solve this problem one might consider to enlarge the heat storage or to delay unloading of the heat storage by mixing the cooling fluid discharged from the storage with cold cooling fluid discharged from the engine. Both solutions, however, are not satisfactory.

While mixing of hot cooling fluid from the heat storage and cold cooling fluid from the engine increases the time required to unload the heat storage, it results in proportionally reduced heating air temperatures.

Enlargement of the heat storage is not possible in most cases due to the limited space available in automotive vehicles. Furthermore, there may be problems of reloading the heat storage when the automotive vehicle is moved only short distances such as in city traffic.

SUMMARY OF THE INVENTION

An object of the present invention is to provide a method and an apparatus for operating a cooling fluid circuit of an internal combustion engine for an automotive vehicle wherein at cold start of the engine the temperature of the heating air which initially was increased rapidly to a comfortable level is prevented form dropping below such level. This is to be achieved at minimal space requirements of the heat storage and in particular by only minimal modifications of prior art cooling fluid circuits. Furthermore, the invention should enable simple and cheap adaptation of the operation to different operative conditions during loading and unloading of the heat storage. Furthermore, reduction of exhaust gas emissions of the engine enabled by the heat of the heat storage should be substantially retained.

In order to meet these objects the present invention provides for a method of operating a cooling fluid circuit of an internal combustion engine for an automotive vehicle at cold start of said engine, said cooling fluid circuit including pump means, a heat storage and heat exchanger means for a cabin heating system, said heat exchanger means having a saturation point and being interconnected between said heat storage and said engine, which method comprises unloading said heat storage to transfer heat thereof to cooling fluid circulating in said cooling fluid circuit and operating said heat exchange means so as to transfer at least some of the heat of the circulating cooling fluid to the heating air of said cabin heating system, with said heat storage being unloaded in a first unloading phase during which the cooling fluid circulates in said cooling fluid circuit at a flow rate substantially corresponding to the saturation point of said heat exchanger means, and thereafter in a second unloading phase during which the cooling fluid circulates in said cooling fluid circuit at a flow rate reduced such that the temperature of the heating air entering the vehicle cabin remains at a substantially uniform level during said second unloading phase until said engine has reached a temperature sufficient to maintain said substantially uniform level.

An apparatus for performing this method in accordance with the invention is characterized by means for reducing the flow rate of the cooling fluid flow in the cooling fluid circuit which is controllable by control means such that the flow rate of the cooling fluid flow in the cooling fluid circuit after a first unloading phase of the heat storage when the flow rate of the cooling fluid flow corresponds to the saturation point of the heat exchanger and will be reduced in a second unloading phase of the heat storage below the saturation point of the heat exchanger such, that the temperature of the heating air entering the vehicle cabin will remain at a substantially uniform level during the second unloading phase.

During the first unloading phase the flow rate of the cooling fluid flow will remain at values corresponding to saturation of the heating system heat exchanger in order the heat exchanger to reach its operative conditions as rapidly as possible so as to ensure a rapid increase of the temperature of the heating air. During the second unloading phase the flow rate of the cooling fluid flow will be drastically reduced, preferably to values corresponding to less than $\frac{1}{3}$, in particular to about $\frac{1}{5}$ to $\frac{1}{12}$ of the saturation point of the heat exchanger. Surprisingly it was found that even though the flow rate of the cooling fluid flow is being decreased in this manner, the temperature of the heating air entering the cabin will remain at a substantially ghih uniform level.

When the heating air flows from the heat exchanger into the vehicle cabin, it passes through the distribution channels of the heating system. The walls there of are still cold when the heat storage begins to be unloaded, and will only gradually be heating depending on their heat capacity, while they cool the heating air correspondingly. In the method of the prior art the temperature of the walls of the distribution channels—due to rapid unloading of the heat storage at high flow rates of the cooling fluid flow—is not yet in balance with the temperature of the heating air when unloading of the heat storage has been terminated. In contrast thereto the method of the present invention enables to reach such a balance of temperatures due to the prolonged unloading phase.

This allows to increase the unloading time of the heat storage several times while the heater performance will remain substantially the same. As a result the level of the temperature of the heating air once reached can be retained long enough for the combustion engine to heat up sufficiently in order to prevent the temperature of the heating air dropping when the cooling fluid circuit will be switched from the storage heat supply mode to the engine heat supply mode. This surprising effect can be explained by the fact that the cooling fluid in the heat exchanger will be cooled more than in the prior art due to the cooling fluid staying in the heat exchanger longer as will be explained in more detail with reference to the embodiments of the invention.

An important feature of the invention is that the flow rate of the cooling fluid flow will be reduced during the second unloading phase substantially below values of the saturation point of the heat exchanger as explained above. When the flow rate will be reduced from 600 l/h e.g. only by 150 l/h to 450 l/h (which could be obtained in the above mentioned prior art cooling fluid circuit by switching off the electrical additional pump), this would not be sufficient to avoid a substantial temperature drop of the heating air. Reduction of the flow rate of the cooling fluid to obtain the benefits of the present invention can be reached by switching off the electrical additional pump only when the flow resistance of the cooling fluid circuit will be increased sufficiently to provide for appropriate restriction of the cooling fluid flow.

An advantageous modification of the invention provides for the cooling fluid to bypass the engine while the heat storage is being unloaded so as to circulate between the heat storage and the heat exchanger. In this mode of operation the total heat removed from the cooling fluid flow by the heat exchanger will be refed into the heat storage. This allows to delay switching of the cooling fluid circuit between the storage heat supply mode and the engine heat supply mode—even at unfavorable conditions such as the idling of the engine, low ambient temperatures, heat storage not being fully loaded, etc.—long enough to provide for a smooth transition of the heating air temperature between the storage heat supply mode and the engine heat supply mode.

The invention has the advantage that it can be put into practice by only minor modifications of prior art cooling fluid circuits. Furthermore, the invention allows to reduce the storage space. Additionally the method and apparatus of the invention may be adapted in a simple and cost effective manner to various operative conditions during loading and unloading of the heat storage.

The invention can be applied both in Gasoline-type and Diesel-type engines.

Further advantageous modifications of the invention are defined in the subclaims.

DESCRIPTION OF THE DRAWINGS

With reference to the drawings embodiments of the invention will be explained in more detail. In the drawings:

FIG. 2 is a schematic representation of a cooling fluid circuit for an internal combustion engine;

FIG. 3 is a representation of a modified embodiment of the cooling fluid circuit corresponding to FIG. 2;

FIG. 4 is a schematic representation of heat exchangers being connected in series;

FIG. 5 shows a modified detail of the cooling fluid circuit in FIG. 2;

FIG. 6 shows a further modified detail of the cooling fluid circuit in FIG. 2;

DETAILED DESCRIPTION OF THE INVENTION

Figure 1:
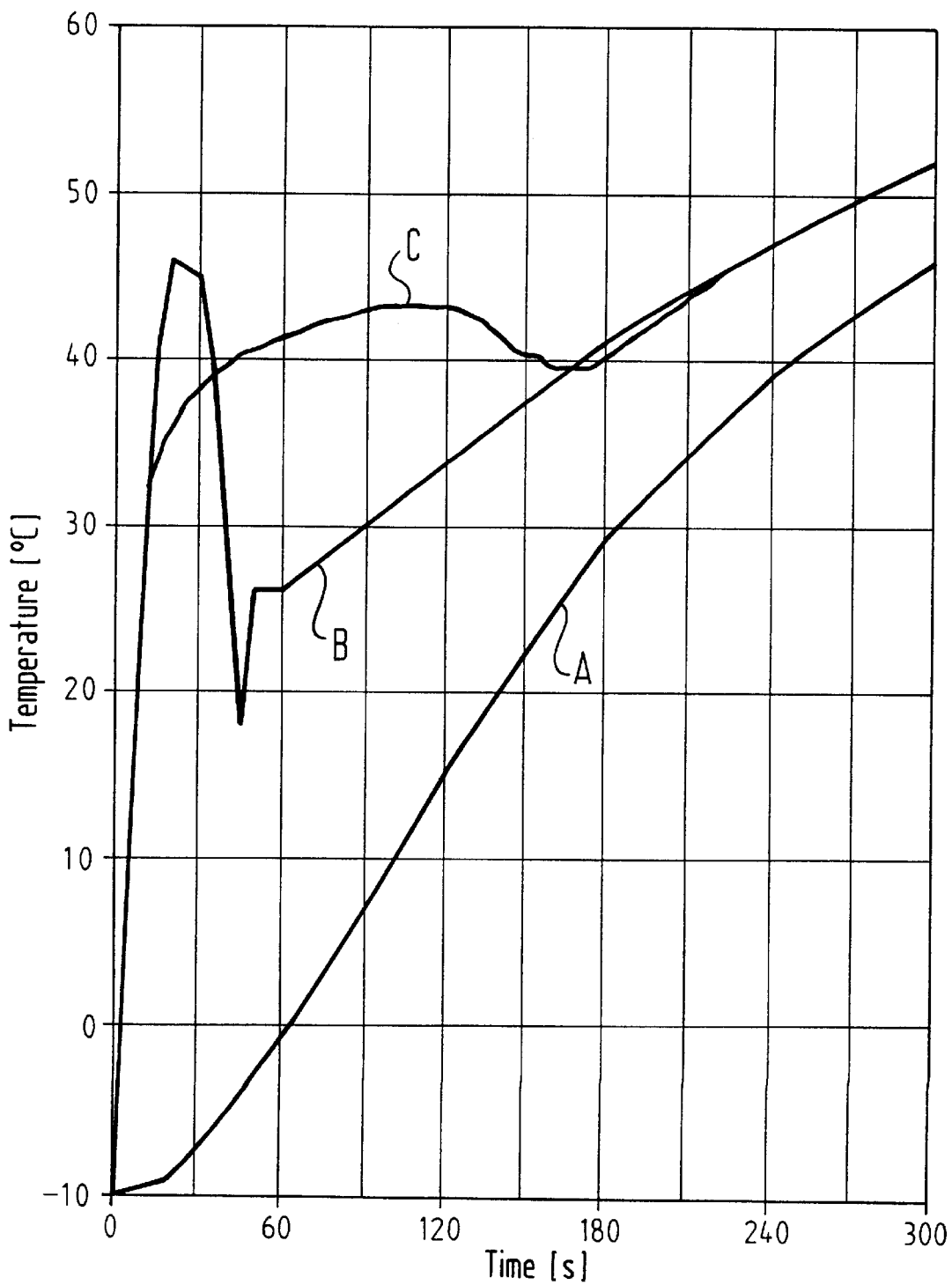
FIG. 1 is a diagram wherein the temperature of the heating air is shown over time.

FIG. 2 shows schematically an internal combustion engine 10 including a cooling fluid circuit 12 which contains a heat storage 14 and a heat exchanger 16 for a cabin heating system (now shown). The cooling fluid circuit 12 furthermore includes a cooling fluid pump 18 driven by the engine 10 and an electrically driven additional pump 20. Furthermore, the cooling fluid circuit 12 has a bypass line 22 bypassing the heat storage 14 and adapted to be controlled by a bypass valve 24.

The heat storage 14 is a cooling fluid storage which can be loaded and unloaded by exchange of the cooling fluid (cooling water).

The cooling fluid circuit 12 has associated therewith an electronic control unit 30 which is connected on the one hand to the additional pump 20 and the bypass valve 24 via control lines and on the other hand receives temperature signals via signal lines from a temperature sensor 32 for sensing the temperature of the heating air and temperature sensors 34, 36, 38, 40 for sensing the temperatures of the cooling fluid at the inlet and outlet of the heat exchanger 16 and, respectively, at the inlet and outlet of the heat storage 14. Furthermore, the control unit 30 receives in the usual manner signals representative of operative parameters of the engine such as its temperature and speed schematically indicated in FIG. 2 by dotted lines 41).

In a method of the prior art the cooling circuit 12 is operated such that during cold start of the engine 10 the cooling fluid is pumped by the electrical additional pump 20 and the cooling fluid pump 18 from the heat storage 14 through the heat exchanger 16 and through the engine 10 and from there back to the heat storage 14. At the time the bypass valve 24 is in a position to close the bypass line 22. As a result the cooling fluid circuit 12 will receive heat from the heat storage 14 (storage heat supply mode).

When the temperature sensor 40 senses that the temperature of the cooling fluid at the outlet of the heat storage 14 decreases, this indicates that the heat storage 14 will be empty within short. The control unit 30 will now actuate the bypass valve 24 such that the cooling fluid will flow through the bypass line 22 to bypass the heat storage 14. The heat exchanger 16 will now be supplied with cooling fluid directly from the engine via the bypass line 22 (engine heat supply mode).

When the engine 10 has reached a sufficiently high temperature, the control unit 30 controls the bypass valve 24 such that the cooling fluid alternatively flows through the heat storage 14 and through the bypass line 22 so that the heat storage 14 will be gradually reloaded in that hot cooling fluid from the engine 10 flows into the heat storage 14 and cold cooling fluid retained in the heat storage 14 will again flow into the cooling fluid circuit 12. When the engine will be turned off, the bypass valve 24 will be controlled such that the total amount of cooling fluid discharged from the engine 10 will pass through the heat storage 14. During a predetermined duration of e.g. 30 sec the additional pump 20 pumps hot cooling fluid from the engine 10 into the heat storage 14 and cold cooling fluid from the heat storage 14 into the engine 10. As a result the heat available in the cooling fluid circuit 12 will be fully consumed.

In this conventional method of operation the heating air indicated by the arrow 17 will be heated during cold start of the engine 10 from a temperature corresponding to the ambient temperature of e.g. −101° C. to a maximal value of e.g. 46° C. This is represented by curve B in the diagram of FIG. 1 wherein the temperature of the heating air 12 at the outlet of the heat exchanger 16 has been drawn over timer. As mentioned above, at this time the cooling fluid will be pumped by the pumps 18 and 20 to flow at a flow rate which substantially corresponds to the saturation point of the heat exchanger 16 and may be e.g. 600 l/h. As also mentioned above, the saturation point of the heat exchanger 16 is defined by a flow rate of the cooling fluid flow resulting in the maximal increase of the temperature of the heating air, i.e. a further increase of the flow rate of the cooling fluid flow does not cause any further significant increase of the temperature of the heating air. In this mode of operation the temperature of cooling fluid when it flows through the heat exchanger 16 will drop only for about 2 to 6° K. The greater portion of the heat of the cooling fluid will be absorbed by the engine 10 and only a small portion thereof will reach the vehicle cabin (not shown) via the heat exchanger 16.

As shown in FIG. 1 the maximal temperature of the heating air of about 46° C. will be reached after about 18 sec. Thereafter, in the method of the prior art the temperature of the heating air will abruptly drop so that it will be even below 20° C. after about 50 sec. Only thereafter the temperature of the heating air will be gradually increased again due to the heat discharged from the engine.

For comparison reasons the curve A represents the temperature of the heating air during cold start of the engine when no hear storage is being used.

The sudden drop of the temperature of the heating air after having reached the maximal temperature is undesired for comfort reasons. Rather, it is preferred to maintain the temperature of the heating air—after the rapid increase thereof during the initial phase of unloading of the heat storage—at a substantially uniform level of e.g. 40° C. until the engine will have heated up sufficiently to ensure a smooth transition of the temperature of the heating air between the storage heat supply mode and the engine heat supply mode.

To this end the control unit 30 in accordance with the present invention ensures that the flow rate of the cooling fluid flow after a first unloading phase during which the cooling fluid circuit if being operated as described above, will be drastically reduced from e.g. 600 l/h to e.g. 100 l/h or even 50 l/h. To this end the control unit 30 turns off the additional pump 20. This will be sufficient to reduce the flow rate of the cooling fluid flow to 100 l/h or 50 l/h only when the cooling fluid circuit 20 will have be designed to exhibit a correspondingly high flow resistance. In order to achieve this in the embodiment of FIG. 2 a line portion through which the cooling fluid passes in the storage heat supply mode has been provided with a fixed restriction 25. It should be noted that a high flow resistance of the cooling fluid circuit 12 may be obtained not only by a fixed restriction 25 but also by respective dimensioning of the length and/or the cross-sectional area of the lines of the cooling fluid circuit 12.

Due to the reduced flow rate of the cooling fluid the discharge of the residual amount of cooling fluid still present in the heat storage 14 at this time will be delayed sufficiently such that the temperature of the heating air will remain substantially at its level until the engine generates sufficient heat further to increase the temperature of the heating air (curve C in FIG. 1).

Even though the flow rate of the cooling fluid flow through the heat exchanger 16 has been reduced, the heat exchanger 16 transfers sufficient heat to the heating air to maintain the temperature level of the heating air. As was found by tests, the drop of the temperature of the cooling fluid in the heat exchanger 16 will be about 3 to 16° K. at a flow rate of the cooling fluid in the range of the saturation point (450 to 600 l/h), however about 20 to 30° K. at a flow rate of about ⅙ of the saturation point (100 l/h). This measured drop of the temperature of the cooling fluid in the heat exchanger 16 may be explained by the face that the time during which the cooling fluid is in the heat exchanger 16 was increased by the factor 6 due to the reduction of the flow rate. As a result the increase of cooling of the cooling fluid will be at a factor of 5.

The increase of energy transfer in the heat exchanger 16 due to the reduction of the flow rate of the cooling fluid results in an offset of the apportioning of the heat from the heat storage 14 between the engine 10 and the heat exchanger 16 in favour of the heat exchanger 16. The apportioning of the energy from the heat storage during cold start of an engine with respect to tested examples of the prior art and the present invention is as follows:

| Apportioning of the energy from the heat storage Decrease of the cooling fluid temperature in the heat exchanger | Prior art (5° K) | Invention (2° K) |
|---|---|---|
| Transfer to heating air | 3,6% | 20,8% |
| Transfer to engine | 58,4% | 33,2% |
| Refed into heat storage | 20,4% | 24,9% |
| Heating of masses/operativeness | 17,0% | 17,0% |
| Conduit losses | 0,7% | 4,2% |
| Sum | 100% | 100% |

As shown above, in the tested example of the invention 20,8% of the energy of the heat storage (as opposed to 3,6% in the prior art) is transferred to the heating air while still 33,2% of the energy (as opposed to 58,4%) is available for heating the engine.

Reducing the flow rate of the cooling fluid flow during the second unloading phase has therefore increased the effectiveness of the heat storage for heating purposes from about 4% to about 20%. As was shown by tests and will be explained below, further measures may be used to increase the effectiveness of the heat storage for heating purposes to about 50% without requiring a change of the commonly used heating systems. Even an increase of the effectiveness to 75 to 80% will be possible by the use of special measures as will be explained in more detail below.

When an additional pump 20 is a pump of variable output, the additional pump 20 can be operated during the second unloading phase with an output reduced in any desired manner.

An other or additional possibility for reducing the flow rate of the cooling fluid flows is to increase the flow resistance of the cooling fluid circuit 12 during the second unloading phase over that in the first unloading phase. This may be achieved for example by replacing the fixed restriction 25 in FIG. 2 by a variable restriction (a throttle valve or flow control valve) as schematically indicted in FIG. 5.

A further possibility is indicated in FIG. 6. Therein a branch line 50 connected in parallel to conduit portion 12a of the cooling fluid circuit 12 is provided with a fixed restriction 25 or an otherwise increased flow resistance. The branch line 50 if adapted to be controlled via a closure valve 52 or a (not shown) more-way valve such that the cooling fluid during the second unloading phase passes through the branch line 50 and accordingly through the restriction 25.

A further possibility for reducing the flow rate of the cooling fluid flow is to provide a cycled closure valve in the cooling fluid circuit as schematically indicated in the cooling fluid circuit of FIG. 3 at 26. The use of such a cycled closure valve is advantageous in that many modern automotive vehicles anyhow have such cycled values at the heating system heat exchanger for the temperature control thereof. The control unit 60 would then enable to open and close the cycled closure valve 26 in any desired sequence in order to provide for the required reduction of the flow rate of the cooling fluid flow. This will result in the surprising effect that enhancement of the heating output will be obtained by "turning down" the heating selector (not shown) usually present in any automotive vehicle.

Switching between the first unloading phase and the second unloading phase may occur after a predetermined duration (for example 12 sec). Another possibility is to provide for such switching when the temperature of the heating air as sensed by the temperature sensor 32 or the temperature of the cooling fluid as sensed by the temperature sensor 34 or 40 will have reached a predetermined value.

During the second unloading phase the flow rate of the cooling fluid flow may be maintained at a practically uniform reduced value. Another possibility would be to control the flow rate of the cooling fluid flow is response to the temperature would of the heating air as sensed by the temperature sensor 32, for example such that the control unit 30 controls the cycled closure valve 26 by using the temperature of the heating air as sensed by the temperature sensor 32 as a control input.

Figure 7:
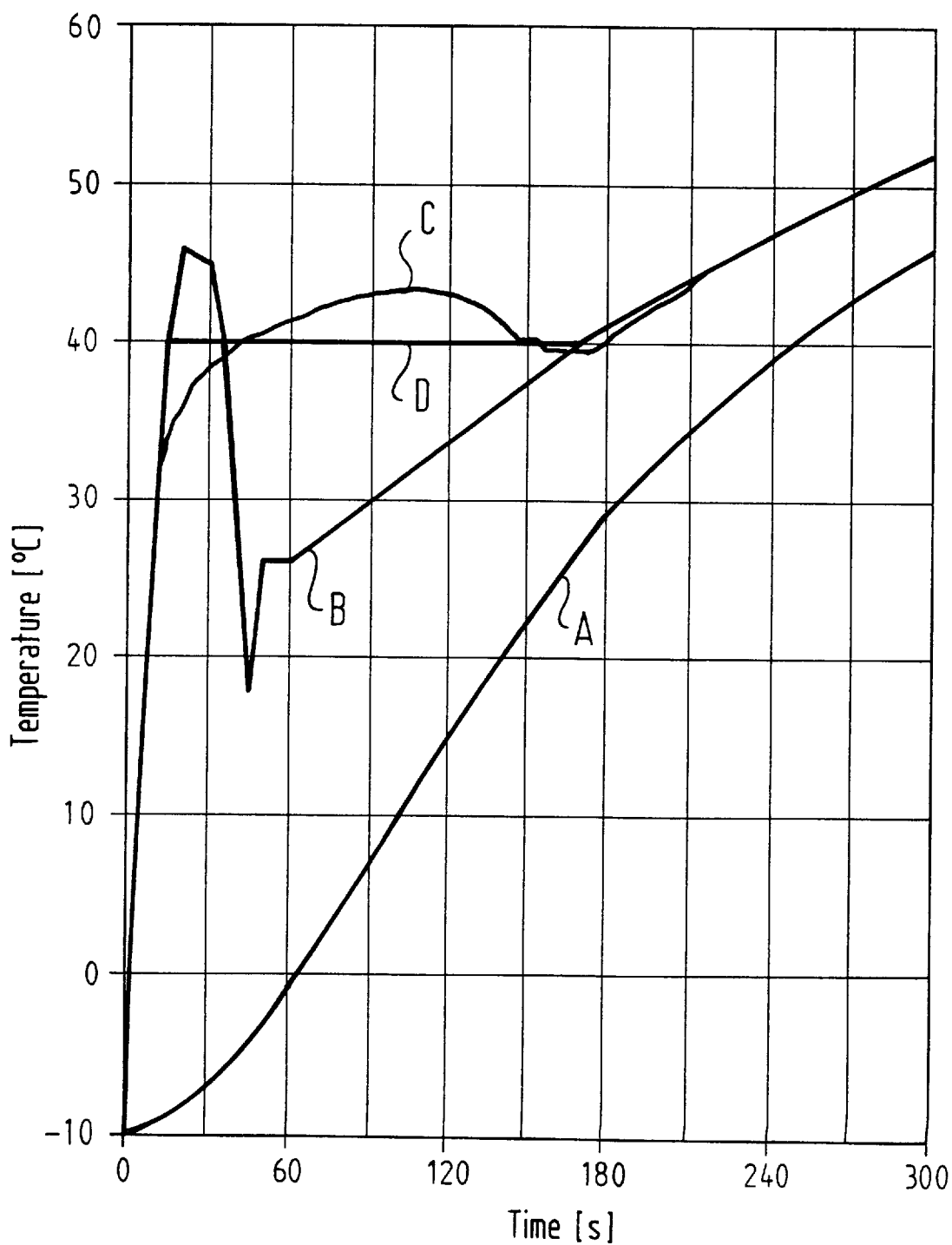
FIG. 7 shows a further improvement of a cooling fluid circuit.

In cases where the heat storage has to be placed in the trunk of a vehicle, the resulting heat losses in the cooling fluid circuit and the difficulties of the fine tuned control may be limited by locating heat storage controls as close to the engine as possible as schematically indicted in FIG. 7.

The reduction of the flow rate of the cooling fluid preferably will be set such that unloading of the heat storage 14 can be terminated when the total amount of the cooling fluid contained in heat storage 14 has passed the heat exchanger 16 for the first time. When at the end of the second unloading phase the bypass valve 24 will be switched from a position in which the cooling fluid flows through the heat storage 14 to a position in which the cooling fluid bypasses the heat storage 14, the flow rate of the cooling fluid flow preferably will increase again to values corresponding to the saturation point of the heat exchanger 16. Such switching from the storage heat supply mode to the engine heat supply mode should occur at the latest when the temperature of the cooling fluid at the inlet of the heat exchanger 16 as sensed by the temperature sensor 34 is similar or less than the temperature of the cooling fluid at the inlet of the heat storage 14 as sensed by the temperature sensor 38, which may be performed by means of a comparing circuit (not shown) of the control unit 30.

Preferably, the above mentioned switching should occur at the latest when the product of the temperature of the cooling fluid at the inlet of the heat exchanger and a relative temperature rise α of the heat exchanger in the storage heat supply mode has reached a similar value in the engine heat supply mode, with $$\alpha = \frac{T_{aus} - T_U}{T_{ein} - T_U}$$

wherein $T_{aus}$=temperature of the heating air at the outlet of the heat exchanger, $T_{ein}$=temperature of the cooling fluid at the inlet of the heat exchanger, $T_U$=temperature of the ambient air.

The cooling fluid circuit shown in FIG. 3 substantially corresponds to the cooling fluid circuit shown in FIG. 2 except for the above mentioned cycled closure valve 26 and except for an additional bypass line 42 bypassing the engine 10 and adapted to be controlled by a bypass valve 44. The cooling fluid circuit of FIG. 3 may be operated much that both during the first and second unloading phase the cooling fluid bypasses the engine 10 via the bypass line 42 so as to circulate directly between the heat storage 14 and the heat exchanger 16. As a result the total heat which was not removed from the cooling fluid by the heat exchanger 16 may be refed into the heat storage 14. This allows—even under unfavorable conditions such as idling of the engine, low ambient temperatures, heat storage not being fully loaded, etc.—to delay switching between the storage heat supply mode and the engine heat supply mode long enough to allow for a smooth transition of the temperature of the heating air between the storage heat supply mode and the engine heat supply mode.

The respective operation preferably will be such that the cooling fluid after the first unloading phase will be fed at a substantially reduced flow rate through the cooling fluid circuit so long until the total amount of cooling fluid contained in the heat storage 14 has performed a complete cycle. When after this first cycle the cooling fluid in the engine 10 had not reached a temperature sufficient for a smooth transition of the temperature of the heating air at the switching point, recirculation of the cooling fluid will be continued until a smooth transition will be possible at the switching point.

The heat exchanger 16 may be a cross-flow heat exchanger as commonly used in the field of automotive vehicles due to its short air paths and due to its small space requirements. However, in order to increase the effectiveness of the heat stored in the heat storage for heating of the heated air, the heat exchanger 16 may be based not on the commonly used cross-flow principle but on the counter-flow principle. Such a counter-flow heat exchanger provides for a relatively higher increase of the temperature of the heating air than a cross-flow heat exchanger and furthermore enables a more substantial temperature drop of the cooling fluid in the heat exchanger so that already the first unloading phase results in a higher temperature of the heated heating air than in the prior art—at similar flow rates of the cooling fluid and similar temperatures of the cooling fluid at the outlet of the heat exchanger—.

A heat exchanger operating similar to a heat exchanger of the counter-flow type may be derived from a common cross-flow heat exchanger at minimal expenditure by having the cross-flow heat exchanger followed on the air side by a second similar heat exchanger such that the cooling fluid flows first through the second heat exchanger before it reaches the first heat exchanger. Such an arrangement of heat exchangers is schematically indicated in FIG. 4 (reference numerals 16a and 16b).

Control of the temperature of the heating air from the vehicle cabin may be obtained in a conventional manner by controlling the flow rate of the heating air flowing through the heat exchanger 16 as schematically indicated at 48 in FIG. 2 (heater control on the air side). Another possibility would be to regulate the temperature of the heating air—also in a conventional manner—by controlling the flow rate of the cooling fluid through the heat exchanger 16, e.g. by means of a cycled closure valve 26 as provided in the cooling fluid circuit of FIG. 3 (heater control of the cooling fluid side).

What is claimed is:

1. A method of operating a cooling fluid circuit of an internal combustion engine for an automatic vehicle at cold start of said engine, said cooling fluid circuit including pump means, a heat storage and heat exchanger means for a cabin heating system, said heat exchanger means having a saturation point and being interconnected between said heat storage and said engine, which method comprises unloading said heat storage to transfer heat thereof to cooling fluid circulating in said cooling fluid circuit and operating said heat exchanger means so as to transfer at least some of the heat of the circulating cooling fluid to heating air of said cabin heating system, with said heat storage being unloaded in a first unloading phase during which the cooling fluid circulates in said cooling fluid circuit at a flow rate substantially at the saturation point of said heat exchanger means, and thereafter in a second unloading phase during which the cooling fluid circulates in said cooling fluid circuit at a flow rate reduced such that the temperature of the heating air entering the vehicle cabin remains at a substantially uniform level during said second unloading phase until said engine has reached a temperature sufficient to maintain said substantially uniform level.

2. A method as defined in claim 1, wherein switching from said first unloading phase to said second unloading phase occurs after a predetermined duration.

3. A method as defined in claim 1, wherein switching from said first unloading phase to said second unloading phase occurs when the temperature of the cooling fluid at the outlet of said heat exchanger means has reached a predetermined value.

4. A method as defined in claim 1, wherein the flow rate of the cooling fluid during the second unloading phase is reduced to a value corresponding to $1/3$ to $1/12$ of the saturation point of said heat exchanger means.

5. A method as defined in claim 1, wherein the flow rate of the cooling fluid in said cooling fluid circuit is reduced at least partially by reducing the output of said pump means.

6. A method as defined in claim 1, wherein the flow rate of the cooling fluid in said cooling fluid circuit is reduced at least partially by increasing the flow resistance of said cooling fluid circuit.

7. A method as defined in claim 1, wherein the reduction of the flow rate of the cooling fluid in said cooling fluid circuit is controlled by use of the temperature of said heating air or a temperature representative thereof as a control input.

8. A method as defined in claim 1, wherein said heat storage is a cooling fluid storage which is loaded and unloaded by exchange of the cooling fluid, and the flow rate of cooling fluid in said cooling fluid circuit is reduced such that said second unloading phase normally can be terminated when the total amount of the cooling fluid contained in said heat storage has passed said heat exchanger for the first time.

9. A method as defined in claim 1, wherein said heat exchanger is supplied with heat of said heat storage when said cooling fluid circuit is operated in a storage heat supply mode and said heat exchanger means is supplied with heat of said engine when said cooling fluid circuit is operated in an engine heat supply mode, switching from said storage heat supply mode to said engine heat supply mode occurs at the end of said second unloading phase, and at the same time the flow rate of cooling fluid flow in the cooling fluid circuit is increased to a value corresponding to the saturation point of said heat exchanger means.

10. A method as defined in claim 9, wherein switching from said storage heat supply mode to said engine heat supply mode occurs at the latest when the temperature of the cooling fluid at the outlet of said heat storage or at the inlet of said heat exchanger means is similar to or less than the temperature of the cooling fluid at the inlet of said heat exchanger means or at the outlet of the engine.

11. A method as defined in claim 9, wherein switching from said storage heat supply mode to said engine heat supply mode occurs at the latest when the product of the temperature of the cooling fluid at the inlet of said heat exchanger means and a relative temperature increase $\alpha$ of said heat exchanger has reached a similar value in the engine heat supply mode, with α being defined as follows:

$$\alpha = \frac{T_{aus} - T_U}{T_{ein} - T_U}$$

wherein $T_{aus}$=temperature of the heating air at the outlet of said heat exchanger means, $T_{ein}$=temperature of the cooling fluid at the inlet of said heat exchanger means, $T_U$=temperature of ambient air.

12. A method as defined in claim 1, wherein said heat storage is a cooling fluid storage which is loaded and unloaded by exchange of the cooling fluid, said cooling fluid circuit being connected at least at certain times during unloading of said heat storage such that cooling fluid bypasses the engine so as to circulate directly between said heat storage and said heat exchanger means.

13. A method as defined in claim 1, wherein said heat exchanger means comprises a counter-flow heat exchanger.

14. A method as defined in claim 1, wherein said heat exchanger means comprises an arrangement of a plurality of cross-flow heat exchangers connected in series.

* * * * *

UNITED STATES PATENT AND TRADEMARK OFFICE
CERTIFICATE OF CORRECTION

PATENT NO. : 6,178,929 B1
DATED : January 30, 2001
INVENTOR(S) : Oskar Schatz

It is certified that error appears in the above-identified patent and that said Letters Patent is hereby corrected as shown below:

Title page, Item [57] Abstract,
Line 2, after "operating" insert -- a --.
Line 17, after "a" insert -- flow --

Column 1,
Line 24, "from;" should be -- from --

Column 2,
Line 53, "exchange" should be -- exchanger --

Column 3,
Line 14, after "order" insert -- for --
Line 24, "ghih" should be -- high --
Line 29, "heating" should be -- heated --

Column 4,
Line 50, "now" should be -- not --

Column 5,
Line 3, "schematically" should be -- (schematically --
Line 25, "alternatively" should be -- alternatingly --
Line 42, "-101° C" should be -- 10° C --
Line 45, "timer" should be -- time --

Column 6,
Line 50, "16° K" should be -- 6° K --
Line 55, "measured" should be -- increased --
Line 56, "face" should be -- fact --

Column 7,
Line 8, "(2° K)" should be -- (20° K) --
Line 57, "values" should be -- valves --

UNITED STATES PATENT AND TRADEMARK OFFICE
CERTIFICATE OF CORRECTION

PATENT NO. : 6,178,929 B1
DATED : January 30, 2001
INVENTOR(S) : Oskar Schatz

It is certified that error appears in the above-identified patent and that said Letters Patent is hereby corrected as shown below:

Column 8,
Line 9, "is" should be -- in --
Line 10, delete "would"
Line 61, "much" should be -- such --

Column 9,
Line 57, claim 1, "automatic" should be -- automotive --

Signed and Sealed this

Eighteenth Day of September, 2001

*Attest:*

*Attesting Officer*

NICHOLAS P. GODICI
*Acting Director of the United States Patent and Trademark Office*